2,791,563
Patented May 7, 1957

2,791,563

METHOD FOR PREPARATION OF 7-DIALKYL-AMINO-4-METHYL COUMARIN SALTS AND COMPOSITIONS CONTAINING SAME

William G. Huey, Nassau, N. Y., assignor to General Aniline & Film Corporation, New York, N. Y., a corporation of Delaware No Drawing. Application June 18, 1952,
Serial No. 294,259

20 Claims. (Cl. 252—301.2)

This invention relate to an improved process for the preparation of water-soluble salts of 7-dialkylamino-4-methyl coumarins in which the alkyl groups of the dialkylamino radical contain 1 to 2 carbon atoms.

It was known heretofore to prepare 7-dialkylamino-4-methyl courmarins, as defined above, e. g. by condensing meta-dimethylaminophenol with ethyl acetoacetate in ethanol, in the presence of zinc chloride as a condensation catalyst (Berichte 30, page 277; 32, page 3690). The condensation product was isolated by drowning the reaction mixture in water and separating insoluble material thereby precipitated from the aqueous liquid. Insoluble material obtained by this procedure generally separates in the form of a tar which is difficult to handle and dry, and from which a crystalline product cannot be readily obtained.

7-diethylamino-4-methyl coumarin is employed as an optical bleaching agent for textiles in view of its property of imparting fluorescence to textiles which increases their appearance of whiteness when viewed in light including ultraviolet radiation. Since the crystalline product is difficulty soluble in water, it has been employed heretofore in the form of an aqueous solution of a salt thereof for treatment of textiles such as wool. Thus, the crystalline product obtained from the tarry condensation mass has been dissolved in water containing sulfuric acid in an amount about three times the weight of the diethylamino methyl courmarin, to prepare a solution for treatment of textiles. The original tarry condensation product is un suitable for marketing and dissolution of the crystalline product in acids is inconvenient.

It is therefore an object of this invention to provide 7-dialkylamino-4-methyl coumarin in the form of readily water-soluble salts, available in dry pulverulent form, yielding solutions suitable for treatment of textiles merely by addition to water.

Another object is to provide a process for preparing such salts directly from the oily or tarry condensation products initially obtained in the preparation of the coumarin compound.

In accordance with my invention, the oily or tarry condensation product obtained by condensing a meta-dialkyl-aminophenol in which the alkyl groups of the dialkylamino radical contain 1 to 2 carbon atoms, with ethyl acetoacetate in the presence of an acid condensing agent such as zinc chloride, drowning in water when condensation is complete, to wash out the condensing agent, and separating the water-insoluble condensation product from the wash water, is converted to a water-soluble salt by grinding with a normally solid sulfonic acid having strongly acidic properties, such as sulfamic acid or naphthalene disulfonic acids, e. g. naphthalene 1,5-, 1,6-, and 1,7-disulfonic acids. In like manner, crystalline 7-dialkyl-amino-4-methyl coumarins, which can be obtained upon purification from the oily or tarry condensation products initially recovered, can be ground with the aforesaid sulfonic acids to form water-soluble salts of the 7-dialkyl-amino-4-methyl coumarins. The solid sulfonic acid is employed in an amount at least stoichiometrically equivalent to the 7-dialkylamino-4-methyl coumarin but ordinarily a substantial excess of the acid is preferable, particularly in grinding the oily to tarry condensation products, the amount of acid in such case ranging initially from 2 to 10 times the weight of the amino-coumarin condensation product with which it is ground.

The process of my invention is illustrated by the following examples, wherein parts are by weight.

Example 1

The oily condensation product obtained from 120 parts of meta-diethylaminophenol and 110 parts of ethyl acetoacetate in the presence of zinc chloride separated from the aqueous wash water after drowning the reaction mixture in water, is added to 730 parts of solid sulfamic acid in a grinding mill such as a ball mill. After brief grinding to insure thorough mixing, a pulverulent solid product is obtained which can be further comminuted, if desired, in a micropulverizer. This product is a tan colored powder, readily and completely soluble in water, and suitable directly for treatment of textiles in aqueous solution. It contains the sulfamic acid salt of 7-diethyl-amino-4-methyl coumarin.

Example 2

The procedure of Example 1 is followed except that 864 parts of solid naphthalene 1,5-disulfonic acid are substituted for the sulfamic acid of the preceding example. The final product thus obtained was a powder similar in appearance and solubility to that of Example 1, and likewise suitable for treatment of textile fabrics or fibers.

If water is occluded by the condensation product of meta-diethylaminophenol and ethyl acetoacetate, because of imperfect separation of aqueous wash water from the drowned reaction mixture, the product initially obtained on grinding with sulfamic acid or 1,5-naphthalene disulfonic acid may take the form of a heavy paste. The water contained in the paste is readily removed by vaporation grinding, and a pulverulent product is thus obtained similar to that of the foregoing examples. Such treatment is illustrated in the following examples:

Example 3

114 parts of 7-diethylamino-4-methyl coumarin in the form of a dark heavy oil containing entrained or occluded water, is stirred with 480 parts of solid sulfamic acid. A rise in temperature of the order of 10 centigrade degrees occurs, and a thick paste is formed due to moisture contained in the condensation product. The paste is ground in a heated mixer whereby water is evaporated and the product is converted to dry powder. The sulfamic acid salt of 7-diethyl-amino-4-methyl coumarin thus obtained is similar to the products of Examples 1 and 2 and can be used directly in aqueous solution as an optical brightener in the treatment of wool.

Example 4

The procedure of Example 3 is repeated, except that 570 parts of solid naphthalene 1,5-disulfonic acid are substituted for the sulfamic acid of Example 3. The product obtained has properties similar to those of the product of Example 2.

Similar water-soluble salts of 7-dimethylamino-4-methyl coumarin or of 7-(methylethylamino)-4-methyl coumarin are obtained in the procedure of the foregoing examples upon substituting equivalent amounts of meta-dimethylaminophenol or of meta-(ethylmethylamino)-phenol for meta-diethylaminophenol.

Moreover, other water-soluble sulfonic acids such as naphthalene-1,6- and naphthalene-1,7-disulfonic acids yield salts similar to those obtained in Examples 2 and 4 when substituted for the naphthalene-1,5-disulfonic acid of said examples. In preparing the pulverulent water-soluble salt of the condensation product, the proportion of solid sulfonic acid can vary from 2 to 10 times the weight of the condensation product with which it is ground. Heating other than to evaporate moisture present in the mixture subjected to grinding is unnecessary.

Variations and modifications which will be obvious to those skilled in the art can be made in the procedures hereinbefore specifically described without departing from the scope or spirit of the invention.

I claim:

1. A process for preparing a pulverulent water-soluble salt of a 7-dialkylamino-4-methyl coumarin in which the alkyl groups of the dialkylamino radical contain 1 to 2 carbon atoms, which comprises adding the 7-dialkylamino-4-methyl coumarin to a normally solid strongly acidic sulfonic acid in an amount at least stoichiometrically equivalent to the amount of said 7-dialkylamino-4-methyl coumarin, and grinding the resulting mixture.

2. A solid pulverulent water-soluble salt formed from a 7-dialkylamino-4-methyl coumarin in which the alkyl groups of the dialkylamino radical contain 1 to 2 carbon atoms with a strongly acidic normally solid sulfonic acid.

3. A pulverizable and readily water-soluble brightening agent consisting essentially of a mixture of a 4-methyl-7-diethylamino-coumarin salt of amidosulfonic acid with severalfold the quantity by weight, relative to the weight of the 4-methyl-7-diethylamino-coumarin combined in said salt, of amidosulfonic acid.

4. A process for preparing a pulverulent readily water-soluble brightening agent, which comprises admixing a 7-dialkylamino-4-methyl coumarin in which the alkyl groups of the dialkylamino radical contain 1 to 2 carbon atoms, with a normally solid sulfonic acid selected from the group consisting of sulfamic acid and naphthalene disulfonic acids, in an amount at least stoichiometrically equivalent to the amount of said 7-dialkylamino-4-methyl coumarin, and grinding the resulting mixture.

5. A method as defined in claim 4, wherein the amount of said sulfonic acid is 2 to 10 times the weight of said 7-dialkylamino-4-methyl coumarin.

6. A process as defined in claim 4, wherein said solid sulfonic acid is sulfamic acid.

7. A process as defined in claim 4, wherein said solid sulfonic acid is a naphthalene disulfonic acid.

8. A process as defined in claim 4, wherein said 7-dialkylamino-4-methyl coumarin is 7-diethylamino-4-methyl coumarin.

9. A process as defined in claim 4, wherein said 7-dialkylamino-4-methyl coumarin is 7-dimethylamino-4-methyl coumarin.

10. A process as defined in claim 4, wherein the 7-dialkylamino-4-methyl coumarin is a condensation reaction product, from which water-soluble components have been removed by washing, of ethyl acetoacetate with a meta-dialkylaminophenol in which the alkyl groups of the dialkylamino radical contain 1 to 2 carbon atoms.

11. A process as defined in claim 10, wherein the mixture subjected to grinding, is heated during grinding to evaporate residual water.

12. A process for the preparation of a pulverizable readily water-soluble brightening agent, which comprises admixing 7-diethylamino-4-methyl coumarin with severalfold the quantity by weight, relative to the weight of the 7-diethylamino-4-methyl coumarin, of sulfamic acid.

13. A readily water-soluble brightening composition comprising a solid pulverulent water-soluble 7-dialkylamino-4-methyl coumarin salt of a normally solid sulfonic acid selected from the group consisting of sulfamic acid and naphthalene disulfonic acids, the alkyl groups of the dialkylamino radical of said coumarin compounds containing 1 to 2 carbon atoms.

14. A composition as defined in claim 13 containing an excess of said sulfonic acid, the amount of the sulfonic acid combined in said salt and present in excess being 2 to 10 times the amount by weight of the 7-dialkylamino-4-methyl coumarin contained in said mixture and combined in said salt.

15. A composition as defined in claim 14, wherein said 7-dialkylamino-4-methyl coumarin salt is a 7-diethyl-4-methyl coumarin salt.

16. A composition as defined in claim 14, wherein said 7-dialkylamino-4-methyl coumarin salt is a 7-dimethylamino-4-methyl coumarin salt.

17. A composition as defined in claim 14, wherein said sulfonic acid is sulfamic acid.

18. A composition as defined in claim 14, wherein said sulfonic acid is a naphthalene disulfonic acid.

19. A pulverulent water-soluble brightening composition consisting essentially of a ground mixture of a 7-dialkylamino-4-methyl coumarin in which the alkyl groups of the dialkylamino radical contain 1 to 2 carbon atoms, with 2 to 10 times the amount by weight of said 7-dialkylamino-4-methyl coumarin, of a normally solid sulfonic acid selected from the group consisting of sulfamic acid and naphthalene disulfonic acids.

20. A pulverulent water-soluble brightening composition consisting essentially of a ground mixture of 7-diethylamino-4-methyl coumarin with 2 to 10 times the amount thereof of sulfamic acid.

References Cited in the file of this patent

UNITED STATES PATENTS

| | | |
|---|---|---|
| 2,600,375 | Ackermann | June 17, 1952 |
| 2,610,152 | Ackermann | Sept. 9, 1952 |
| 2,654,713 | Fleck | Oct. 6, 1953 |

FOREIGN PATENTS

| | | |
|---|---|---|
| 566,810 | Great Britain | Jan. 15, 1945 |
| 644,201 | Great Britain | Oct. 4, 1950 |